(12) United States Patent
Katz

(10) Patent No.: US 9,046,929 B2
(45) Date of Patent: *Jun. 2, 2015

(54) SYSTEM AND METHOD FOR INPUTTING USER COMMANDS TO A PROCESSOR

(71) Applicant: Itay Katz, Tel Aviv (IL)

(72) Inventor: Itay Katz, Tel Aviv (IL)

(73) Assignee: eyeSight Mobile Technologies Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,339

(22) Filed: Jan. 17, 2014

(65) Prior Publication Data

US 2014/0132515 A1     May 15, 2014

Related U.S. Application Data

(60) Continuation of application No. 13/332,413, filed on Dec. 21, 2011, now Pat. No. 8,648,828, which is a division of application No. 10/593,628, filed as application No. PCT/IL2005/000323 on Mar. 22, 2005, now Pat. No. 8,199,115.

(30) Foreign Application Priority Data

Mar. 22, 2004 (IL) .......................................... 161002

(51) Int. Cl.
*G06F 3/041* (2006.01)
*G06F 3/01* (2006.01)
*G06F 3/03* (2006.01)
*G06T 7/00* (2006.01)
*G06T 7/20* (2006.01)

(52) U.S. Cl.
CPC .............. *G06F 3/017* (2013.01); *G06F 3/0304* (2013.01); *G06T 7/0079* (2013.01); *G06T 7/20* (2013.01)

(58) Field of Classification Search
CPC ..... G06F 3/017; G06F 3/0304; G06F 3/0425; G06F 3/011; G06F 3/0346; G06F 3/03545; G06F 3/04883; G06F 3/0325; G06F 3/005; G06F 3/042; G06F 1/1626; G06F 1/1686; A63F 2300/1087; G06K 9/00355; H04N 21/4223; H04N 5/225
USPC ......... 345/156–178; 178/18.01–18.09, 18.11, 178/19.01–19.07, 20.01
See application file for complete search history.

(56) References Cited

U.S. PATENT DOCUMENTS

| | | | | |
|---|---|---|---|---|
| 6,191,773 | B1 * | 2/2001 | Maruno et al. | 345/158 |
| 6,947,029 | B2 * | 9/2005 | Katagiri et al. | 345/158 |
| 2002/0140667 | A1 * | 10/2002 | Horiki | 345/156 |

* cited by examiner

*Primary Examiner* — Stephen Sherman
(74) *Attorney, Agent, or Firm* — Lowenstein Sandler LLP; Ariel Reinitz

(57) ABSTRACT

A system for inputting operation system (OS) commands to a data processing device. The system comprises a video camera that captures images of a viewing space. A processor detects a predetermined object in the images using an object recognition algorithm not involving background information in an image. One or more image analysis parameters of the object are extracted from the images and one or more motion detection tests are applied. Each motion detection test has an associated OS command, and when a test succeeds, the OS command associated with the test is executed. By not relying on background information in an image, the system of the invention may be used in devices that are moved in use, such as a palm plot, personal digital assistant (PDA), a mobile telephone, a digital camera, and a mobile game machine.

23 Claims, 2 Drawing Sheets

SYSTEM AND METHOD FOR INPUTTING USER COMMANDS TO A PROCESSOR

FIELD OF THE INVENTION

This invention relates to devices configured to receive a user input.

BACKGROUND OF THE INVENTION

Entering data into a data processing device is accomplished using a data input device such as a keyboard, mouse, or joystick. Although electronic devices are constantly being miniaturized, the size of the various associated data input devices cannot be substantially decreased since they must conform to the size of the user's hands. Methods for inputting data have therefore been devised in which the user's hands do not have to touch the device. U.S. Pat. No. 5,767,842 to Korth, and U.S. Pat. No. 6,650,318 to Amon for example, disclose an optical system in which a camera is used to monitor a user's hand and finger motions. A software application interprets these motions as operations on a physically non-existent computer keyboard or other input device. In these systems, the camera has a fixed position, so that the background of the images remains constant. This allows the software application to make use of informational present in the constant background in order to detect the user's hands in each image. This system, therefore, cannot be used in a device that in use is moved, because in this case, the background of the images is not constant, so there is no reliable background information in the images. Devices that are moved in use include hand-held devices such as a palm plot, personal digital assistant (PDA), a mobile telephone, a digital camera, and a mobile game machine.

SUMMARY OF THE INVENTION

The present invention provides a method and system for inputting operating system (OS) commands to a data processing device. The system of the invention may be used to input OS commands to the device instead of or in addition to any input devices associated with the device such as a keyboard, mouse or joystick. The system of the invention my be used in any type of data processing device such as a personal computer (PC), a portable computer such as a PDA, a laptop or a palm plot, a mobile telephone, a radio or other entertainment device, a vehicle, a digital camera, a mobile game machine, a computerized medical device and a smart house product.

The system of the invention comprises a video camera and a processor. The camera is positioned to capture images in a viewing space. Images captured by the camera are digitized by the camera and input to the processor. The processor is configured to run a software application that analyzes images captured by the camera, preferably in real time. The analysis performed by the software application includes detecting in an image obtained at a time $t_k$ a predetermined object in the viewing space of the camera. The object may be, for example, one or more fingers of a user or a hand held stylus.

In accordance with the invention, detecting the object in an image is done using an algorithm that does not rely on background information present in the image. By not relying on background information in an image, the system of the invention may be used in devices that are moved in use. For example, the object may be detected in an image using a segmentation algorithm. Methods for segmentation are disclosed, for example, in Gonzalez, R. C. and Woods, R. E. [2002]. *Digital Image Processing*, 2nd ed., Prentice Hall, Upper Saddle River, N. J.; R. Gonzalez, "Digital Image Processing using Matlab", Pearson Prentice Hall 2004; and in Sigal, L et al "Estimation and Prediction of Evolving Color Distributions for Skin Segmentation Under Varying Illumination", BU CS TR99-015.v2, December 1999 (revised in March 2000). Any type of segmentation algorithm may be used in the system of the invention, such as a "WaterShed" segmentation or a "growing region segmentation", as is known in the art.

A segmentation algorithm is a multi-staged process, where at each stage the image is binarized into set of pixels having intensity (for example, either on a gray level scale or any one or more of a red, green or blue scale) below a particular threshold and the set of pixels having intensity above the threshold. At each stage, the threshold is incremented and contiguous sets of pixels in each set are identified. At the end of the process, stable sets of contiguous points are identified. A stable set of contiguous pixels is a set that remained constant during a predetermined number of consecutive stages of the process. After the stable contiguous sets of pixels have been identified in the image, an object recognition procedure is performed on the stable sets to identify the object among the stable sets. The object recognition procedure makes use of previously obtained image data relating to features of the object such as its eccentricity or dimensions. The same previously obtained image data may be applied to each image, or the image data may be updated on the basis of recent earlier images of the object. Any object recognition procedure may be applied to the stable sets. For example, an adaptive linear combination may be calculated of one or more of the features of the object and applied to each of the stable sets.

The software application also extracts from an image obtained at a time $t_k$ one or more image analysis parameters $x_i(t_k)$. One or more of the image analysis parameters may be history independent, such as the pixel address in the image of the tip or width of the object in pixels in the image, the length in pixels of the object in the image, or the orientation of the object in the image. One or more of the image analysis parameters may be history dependent, in which case extraction of the parameters is performed on the image together with previously and/or subsequently obtained images. Such history dependent parameters include the speed of the object at the time of the image, the change in the size of the width of the object at the time of the image, or the rate and direction of rotation of the object at the time of the image. One or more of the image analysis parameters may be binary parameters. For example, a parameter may take on the value 1 if the object is detected in the viewing space and the value 0 if the object is not detected in the viewing space. The analysis of the software thus generates a time sequence of vectors $X(t_k) = \{x_1(t_k), \ldots, x_n(t_k)\}$ that is stored in the memory. The software is further configured to apply one or more motion detection tests to one or more of the vectors X obtained in a recent time window and stored in the memory. The time window may be, for example 0.5 sec, or 1 sec. Each test detects a specific type of motion of the object during the time window. A test may be a binary test, in which case the result of the test is an indication 0 that the test failed (i.e. the object did not perform the motion detected by the test during the time window) or an indication 1 that the test succeeded it (i.e. the object performed the motion detected by the test). Alternatively, the result of a test may be a number between 0 and 1. One or more of the tests may be defined as a linear combination of previously defined tests. In these cases, determining whether a test succeeds or fails may be performed, for example, using a state machine, morphological algorithms, or a neural network.

As a first example, a test may be, for example, that during the time window the object approached the camera. This test succeeds if the width of the object in pixels increased during the time window. As a second example, a test may be for example that the object moved away from the camera (the width of the object in pixels decreased during the time window). Other examples of tests include that the object first approached the camera and then moved away from the camera during the time window, the object disappeared from viewing space of the camera, the object moved in a predetermined path such as in a circle or so as to trace an alphanumeric character, the object rotated, the object was stationary, the object moved (performed any type of motion), the object performed a flicking motion, the object accelerated, the object decelerated, the object moved and then stopped, or the object remained stationary at a particular location for predetermined amount of time.

The memory of the system stores a look-up table that provides, for each test an associated OS command. When a test succeeds, the OS command associated with the test is executed. The OS commands may be, for example, depressing a virtual key displayed on the display screen, moving a curser appearing on the display screen to a new location on the screen, running on the processor a software application stored in the memory, turning on or off a light associated with the device, changing the sound level or station on a radio, or turning off the device, zooming in or out of an image displayed on a screen, controlling a surgical instrument, and sending a command to an application (eg. sending a "shooting" command to a game application).

Preferably, there is an intuitive relationship between the motion detected by a test and the OS command associated with the test. The following are examples of an intuitive relationship between a motion detected by a test and the associated OS command.

A test that detects that the object moved towards the camera and then moved away from the camera may have an associated OS command of depressing a key on a virtual keyboard to which a curser on the screen is presently pointing.

A test that detects a linear movement of the object across the viewing space may have an associated OS command of dragging an object such as a cursor to a new location on the display screen.

A test that detects whether the object has traced out a path in the viewing space of the camera in the shape of a particular alphanumeric character may have an associated OS command of depressing a key on a virtual keyboard displayed on a display of the device for that alphanumeric character.

A test that detects a "shooting motion" of the object may have an associated OS command of "shooting" at a target appearing on the display.

A test detecting a flicking motion of the object may have an associated OS command of turning off the device.

The system of the invention may be used in devices adapted to be worn, such as a pendent or goggles. The system allows OS commands to be input to the device without touching the device. The device is thus of benefit to users whose hands are soiled, such as technicians, cooks, and surgeons. The system may also be used in devices having one or more 3-dimensional virtual objects.

Thus, in its first aspect, the invention provides a system for inputting operation system (OS) commands to a data processing device comprising:
(a) a video camera capturing images of a viewing space; and
(b) a processor configured to:
  i) detect a predetermined object in one or more images obtained by the camera using an object recognition algorithm not involving background information in an image;
  ii) extract one or more image analysis parameters of the object in the one or more images obtained by the camera; and
  iii) for each of one or more motion detection tests:
    (I) applying the motion detection test to image analysis parameters extracted during a recent time window; and
    (II) executing an operating system command associated with the motion detection test if the motion detection test succeeds.

In its second aspect, the invention provides a data processing device comprising the system for inputting operation system (OS) commands of the invention.

In its third aspect, the invention provides a method for inputting operation system (OS) commands to a data processing device having a video camera capturing images of a viewing space, comprising:
  a. detecting a predetermined object in one or more images obtained by the camera using an object recognition algorithm not involving background information of an image;
  b. extracting one or more image analysis parameters of the object in the one or more images obtained by the camera; and
  c. for each of one or more motion detection tests:
    i. applying the motion detection test to image analysis parameters extracted during a recent time window; and
    ii. executing an operating system command associated with the motion detection test if the motion detection test succeeds.

In its fourth aspect, the invention provides a computer program comprising computer program code means for performing all the steps of the method of the invention.

In its fifth aspect, the invention provides a computer program of the invention embodied on a computer readable medium.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
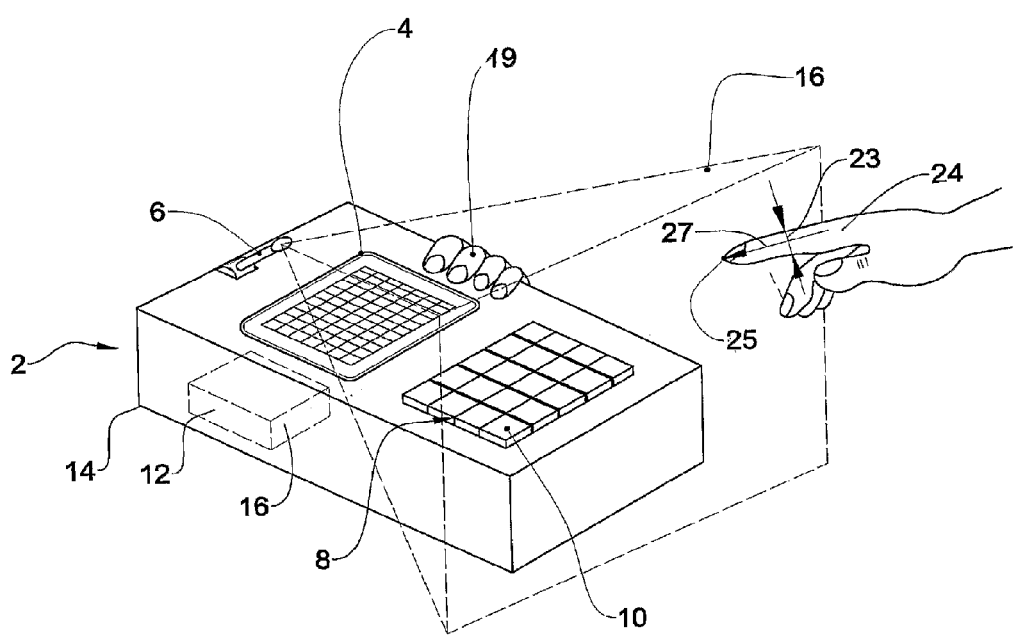
FIG. 1 shows a device having a system for inputting OS commands to a data processing device in accordance with one embodiment of the invention.

FIG. 1 shows a data processing device 2 in accordance with one embodiment of the invention. The data processing device 2 may be, for example, a personal computer (PC), a portable computer such as a PDA, a laptop or a palm plot, or a mobile telephone, a radio or other entertainment device, a vehicle, a digital camera or a mobile game machine. The device 2 has a video camera 6. The device 2 may also be provided with a display screen 4 and various data input devices such as a keypad 8 having a plurality of keys 10 for inputting data into the data input device 2.

The device 2 has a processor 12 inside housing 14. The processor 12 is configured to receive data from the camera 6 and any other input devices associated with the device 2 such as the keypad 8.

The camera 6 views a conical or pyramidal volume of space 16 indicated by the broken lines. The camera 6 may have a fixed position on the device 2, in which case the viewing space 16 is fixed relative to the device 2, or may be positionable on the device 2, in which case the viewing space 16 is selectable relative to the device 2. Images captured by the camera 6 are digitized by the camera 6 and input to the processor 12.

Figure 2:
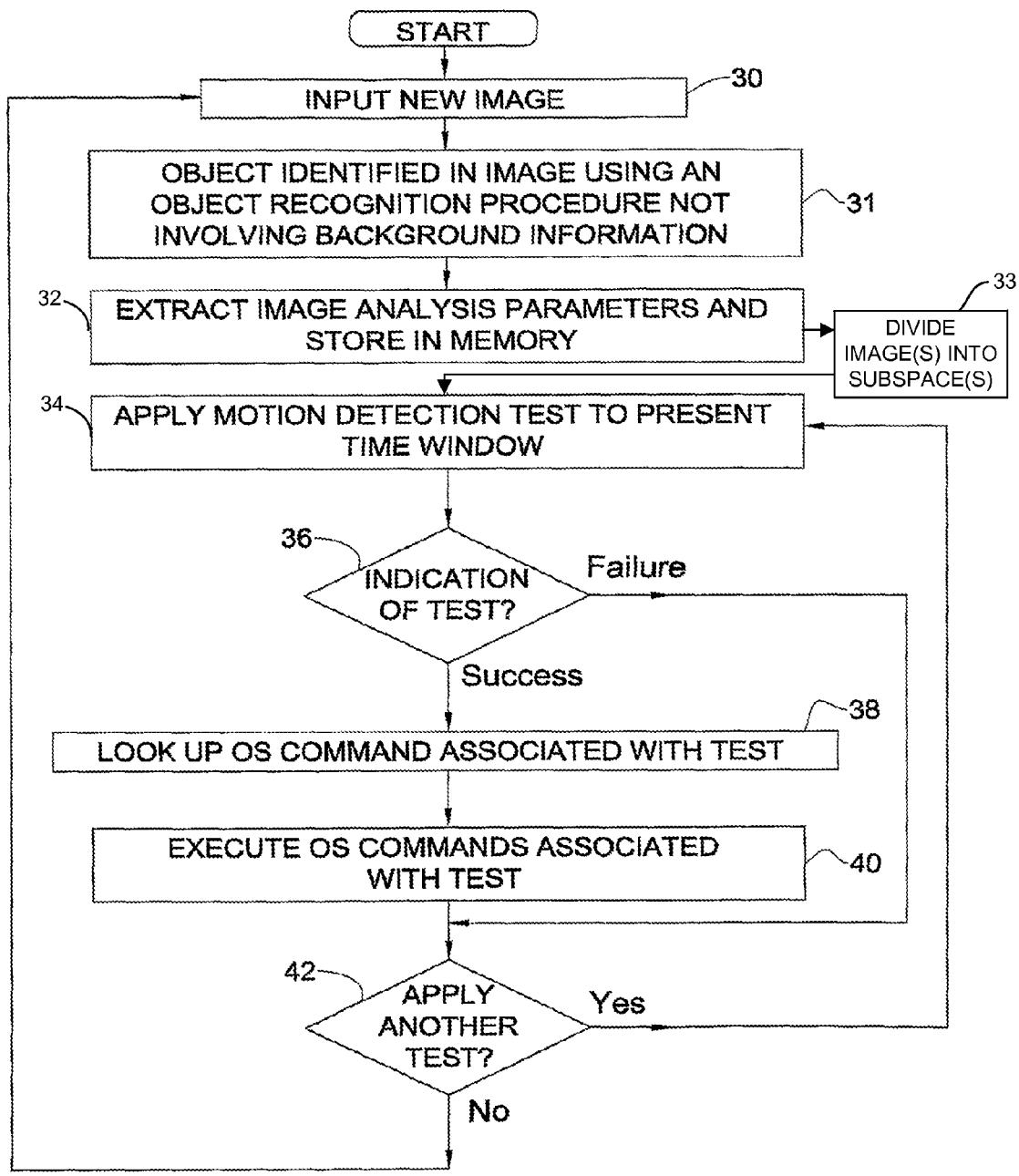
FIG. 2 shows a method for inputting OS commands to a data processing device in accordance with the method of the invention.

The processor 12 is configured to run a software application that analyzes images captured by the camera 6. The analysis performed by the software application includes detecting in an image obtained at a time $t_k$ a predetermined object 24 in the viewing space 16. As explained above the object 24 is detected using an object recognition algorithm that does not involve background information of the image, for example, by using a segmentation algorithm. The object 24 may be for example a finger of a user as shown in FIG. 2. Alternatively, the object may be a hand held stylus (not shown). The object 24 has a length and orientation in the viewing space represented by means of a vector 27 having a tip 25 at a free end of the object 24. The object 24 also has a width 23. The user may use his other hand 19 to hold the device 2 in use, if the device 2 is a hand-held device. The hand 19 may also be used to activate real input devices associated with the device 2, such as activating keys 10 on the keypad 8.

The software application is further configured to extract from an image obtained at a time $t_k$ one or more image analysis parameters $x_i(t_k)$. One or more of the image analysis parameters may be history independent, such as the pixel address in the image of the tip 25, the width 23 of the object 24 in pixels in the image, the length in pixels of the object 24 in the image, or the angle that the vector 27 makes in the image with a fixed direction. One or more of the image analysis parameters may be history dependent, in which case extraction of the parameters is performed on the image together with previously and/or subsequently obtained images. Such history dependent parameters include the speed of the tip 25 at the time $t_k$ of the image, the change in the size of the width 23 of the object 24 at the time of the image, or the rate of rotation of the vector 27 at the time of the image. One or more of the image analysis parameters may be binary parameters. For example, a parameter may take on the value 1 if the object 24 is detected in the viewing space and the value 0 if the object 24 is not detected in the viewing space. The analysis of the processor thus generates a time sequence of vectors $X_k = \{x_1(t_k), \ldots, x_n(t_k)\}$ that is stored in the memory 16.

The software application also applies one or more motion detection tests to one or more of the vectors $X_k$ obtained in a recent time window and stored in the memory 16. The time window may be, for example 0.5 sec, or 1 sec. The length of the time window may be different for different tests. Each test detects a specific type of motion of the object 24 during the time window. The result of each test is an indication that the test failed (i.e. the object 24 did not perform the motion detected by the test during the time window) or an indication that the test succeeded it (i.e. the object 24 performed the motion detected by the test). As explained above, a test may or may not be a binary test. The result of test may depend upon a user input. For example, a test may give an indication of success only if the user simultaneously depressed a predetermined key on the keypad 8.

As a first example, a test may be, for example, that during the time window the object 24 approached the camera. This test produces an indication of success if the width 23 of the object in pixels increased during the time window. As a second example, a test may be for example that the object moved away from the camera (the width 23 of the object in pixels decreased during the time window). Other examples of tests include that the object 24 first approached the camera and then moved away from the camera during the time window, the object disappeared from viewing space 16, the object moved in a predetermined path, the object rotated, the object was stationary, the object moved (performed any type of motion), the object performed a flicking motion, the object accelerated, the object decelerated, or the object moved and then stopped.

The memory 16 stores a look-up table that provides, for each test an associated OS command. When a test succeeds, the OS command associated with the test is executed. The OS commands may be, for example, depressing a virtual key displayed on the display screen, moving a curser appearing on the display screen to a new location on the screen, running on the processor 12 a software application stored in the memory 16, or turning off the device 2. The device may provide an indication that the OS command was executed. For example, an OS command equivalent to depressing a key on the virtual keyboard may be indicated by briefly showing the key depressed on a virtual keyboard on the screen 4, or by briefly changing the appearance of the key. Other possibilities for indicating that the OS command was executed include briefly enlarging or otherwise changing the appearance of a depressed key or of the cursor on the screen 4, displaying an icon on the screen 4, producing a sound, and vibrating the device.

At step 33, the viewing space 16 may be divided into two or more independent subspaces, with different tests being applied to motion of the object 24 in the different subspaces.

FIG. 2 shows a flow chart for a method for inputting an OS command to a data processing device in accordance with one embodiment of the method of the invention. In step 30 an image obtained by the camera 6 is input to the memory 16 of the processor 12. In step 31, the predetermined object 24 is identified in the image using an object recognition procedure that does not involve background information in the image. In step 32, one or more image analysis parameters are extracted from the image and stored in the memory 16. In step 34 a motion detection test is applied to the extracted image analysis parameters obtained during a recent time window and stored in the memory 16. In step 36 the indication of the test is determined. If the indication is "success", i.e. the test detected the type of motion detected by the test, then in step 38, the OS command associated with the test is looked up in the look-up table stored in the memory 16, and in step 40, the OS command associated with the test is executed. If at step 36 it is determined that the indication of the test is "failure", i.e. the test did not detect the type of motion detected by the test, or after step 40, if the indication of the test was 1, the process proceeds to step 42 where it is determined whether another motion test is to be applied to the image. If yes, the process returns to step 34 with another motion detection test being applied to the image. If no (i.e. all of the motion detection tests have been applied to the present time window) then the process returns to step 20 with a new image obtained by the camera 6 being input to the memory 16.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A system comprising:
    a processor configured to:
        receive one or more images;
        detect an object in the one or more images;
        extract one or more image analysis parameters associated with the object;
        divide the one or more images into at least a first subspace and a second subspace;
        apply a motion detection test to the one or more image analysis parameters; and
        based on a result of the motion detection test, execute a command associated with the motion detection test and the first subspace or the second subspace.

2. The system of claim 1, wherein the object is a finger or a stylus.

3. The system of claim 1, wherein one or more of the one or more image analysis parameters is history dependent.

4. The system of claim 1, wherein one or more of the one or more image analysis parameters comprises at least one of: a location of a tip of the object in an image, a width of the object in an image, a length of the object in an image, an orientation of the object in an image, a speed of the object at a time the image was obtained, a change in the a width of the object at a time the image was obtained, a rate of rotation of the object at a time the image was obtained, or an image analysis parameter having a first value if the object is detected in the image and a second value if the object is not detected in the image.

5. The system of claim 1, wherein the motion detection test is a motion detection test that detects that the object moved in a predetermined path during a time window.

6. The system of claim 1, wherein the processor is further configured to at least one of (a) apply a first motion detection test associated with the first subspace to image analysis parameters associated with the first subspace, or (b) apply a second motion detection test associated with a second subspace to image analysis parameters associated with the second subspace.

7. The system of claim 1, wherein to execute a command associated with the motion detection test is to at least one of (a) execute, based on the result of the motion detection test with respect to the first subspace, a first command, or (b) execute, based on the result of the motion detection test with respect to the second subspace, a second command.

8. The system of claim 1, wherein the command comprises at least one of (a) a command to zoom in to or (b) a command to zoom out of at least one of the first subspace or the second subspace.

9. The system of claim 1, wherein the command comprises at least one of (a) a command to control a cursor or (b) a command to send a command to an application.

10. The system of claim 1, wherein the command comprises at least one of (a) a command to depress a virtual key or (b) a command to send a command to an application.

11. The system of claim 1, wherein the motion detection test comprises at least one of (a) a determination that a width of the object increased or (b) a determination that a width of the object decreased.

12. A method comprising:
    receiving one or more images;
    detecting an object within (a) a first subspace of the one or more images or (b) a second subspace of the one or more images;
    extracting, by a processing device, one or more image analysis parameters associated with the object;
    applying, to the one or more image analysis parameters, (a) a first motion detection test with respect to the first subspace and (b) a second motion detection test with respect to the second subspace;
    based on a result of the first motion detection test, executing a command associated with the first motion detection test; and
    based on a result of the second motion detection test, executing a command associated with the second motion detection test.

13. The method of claim 12, wherein the object is one or more fingers or a stylus.

14. The method of claim 12, wherein one or more of the one or more image analysis parameters is history independent.

15. The method of claim 12, wherein one or more of the one or more image analysis parameters comprises at least one of: a location of a tip of the object in an image, a width of the object in an image, a length of the object in an image, an orientation of the object in an image, a speed of the object at a time the image was obtained, a change in the a width of the object at a time the image was obtained, a rate of rotation of the object at a time the image was obtained, or an image analysis parameter having a first value if the object is detected in the image and a second value if the object is not detected in the image.

16. The method of claim 12, wherein one or more of the first motion detection test or the second motion detection test is a motion detection test that detects that the object moved in a predetermined path during a time window, wherein the predetermined path traces an alphanumeric character.

17. The method of claim 12, wherein at least one of (a) the command associated with the first motion detection test or (b) the command associated with the second motion detection test comprises at least one of: depressing a virtual key displayed on a screen, moving a cursor appearing on a screen, running a software application, turning a light on or off, turning off a system, zooming in or out of a picture on a screen, adjusting a radio or other entertainment device, adjusting a medical device, or sending a command to an application.

18. The method of claim 12, wherein the command associated with the first motion detection test comprises a command to change a sound level and the command associated with the second motion detection test comprises a command to change a channel.

19. A system comprising:
    at least one processor configured to:
        detect an object within one or more images obtained using an object recognition algorithm, whether information indicating a pixel in the one or more images is either a background pixel or an object pixel is unknown prior to detection of the object;
        extract one or more image analysis parameters of the object;
        applying a motion detection test to the one or more image analysis parameters; and
        based on a result of the motion detection test, execute a command associated with the motion detection test.

20. The system of claim 19, wherein the command comprises a command to change an appearance of an icon.

21. The system of claim 19, wherein the processor is further configured to provide an indication that the command was executed.

22. The system of claim 21, wherein the indication comprises a change in an appearance of an icon.

23. A non-transitory computer readable medium having instructions encoded thereon that, when executed by a processing device, cause the processing device to perform operations comprising:
- detecting an object within a subspace of one or more images;
- extracting one or more image analysis parameters associated with the object; and
- applying a motion detection test to the one or more image analysis parameters; and
- based on a result of the motion detection test, executing a command associated with the motion detection test and the subspace of the one or more images.

\* \* \* \* \*